United States Patent [19]
Klein

[11] 3,868,844
[45] Mar. 4, 1975

[54] DYNAMIC ARTERIAL BLOOD PRESSURE SIMULATOR

[76] Inventor: Burton Klein, 4 Ellsworth Ave., Cambridge, Mass. 02139

[22] Filed: May 11, 1973

[21] Appl. No.: 359,532

[52] U.S. Cl. .................................. 73/4 R, 35/17
[51] Int. Cl. .............................................. G01l 27/00
[58] Field of Search ...... 73/4 R; 35/17; 128/2.05 D, 128/2.05 E, DIG. 3

[56] References Cited
UNITED STATES PATENTS

| | | | |
|---|---|---|---|
| 2,600,324 | 6/1952 | Rappaport | 73/4 R |
| 2,954,738 | 10/1960 | DiVette | 128/DIG. 3 |
| 3,376,660 | 4/1968 | McGinnis | 35/17 |

OTHER PUBLICATIONS
Fischer et al., Annals of Surgery, Sept., 1952, pages 475 & 476.

Primary Examiner—S. Clement Swisher
Attorney, Agent, or Firm—John M. Brandt

[57] ABSTRACT

A dynamic arterial blood pressure simulator is disclosed comprising a pressure chamber, a flexible member in the wall of the chamber, a cam having a shape proportionate to at least one hypothetical arterial blood pressure cycle, and means for driving the cam to displace the flexible member producing a variable pressure within the chamber. The pressure is delivered to an appropriate sensing apparatus for proving or calibrating such apparatus.

8 Claims, 4 Drawing Figures

DYNAMIC ARTERIAL BLOOD PRESSURE SIMULATOR

BACKGROUND OF THE INVENTION

1. Field of the Invention

The invention resides in the field of proving and calibrating devices and more particularly in the field of dynamic pressure simulators which may be used for reproducing a unique repetitive continuum of pressure valves varying with time.

2. Description of the Prior Art

A variety of pressure simulators exist in the prior art generally classed as either static or dynamic simulators. The object of most static simulators is to produce one or a series of extremely accurate pressure valves for calibrating instruments depending upon changes in pressure for their operational readings; altimeters for example. Dynamic pressure generators produce a continually varying series of pressure valves, a pressure cycle varying with time, for testing or calibrating certain transducers most notably piezo electric crystals. By and large these inventions are laboratory devices intended to calibrate a transducer either prior to introduction into a completed instrument or prior to delivery of the entire instrument. In using these inventions, the transducers are either discarded if they do not meet the standard or norm, or the instrument itself is calibrated to offset individual transducers. Once the transducer or instrument is calibrated it is assumed the calibration is retained for a substantial period without rechecking.

SUMMARY OF THE INVENTION

As specified in the abstract, the invention may be summarized as a dynamic arterial blood pressure simulator which produces a variable pressure for delivery to direct reading blood pressure apparatus for proving and/or calibrating the apparatus. The invention is designed to be employed at the point of use of the apparatus itself and to provide a unique variable pressure output which is analogous to the varying blood presssure response obtained from an average or hypothetical individual.

Since irregularities in shape as well as maximum and minimum of actual patient blood pressure curves yield diagnostic information, it is important to varify the accuracy of the measuring apparatus output. Transducers used in direct reading devices are extremely sensitive and are subject to mishandling in daily use. The electronics employed to covert the transducer response to an interpretable signal are equally subject to mishandling and/or component breakdown. The present invention is designed to produce a simulated blood pressure curve at the site of use of a direct reading device, for example at bedside just prior to patient transducer hook-up, to in turn produce a response by the direct reading device, both transducer and electronics, which will be familiar to a medical diagnostician.

By employing the invention, it is thus possible to detect a malfunctioning transducer and additionally to detect and adjust or replace malfunctioning electronics.

Specifically the invention employs a pressure or working chamber, a flexible member in the wall of the chamber, a diaphragm or billows for example, a cam of a shape proportionate to at least one cycle of hypothetical arterial blood pressure, and means to drive the cam to displace the flexible member to produce a variable pressure within the chamber corresponding to the variations of the hypothetical blood pressure cycle. An output port is provided in the chamber for transmitting the varying pressure to a direct blood pressure reading transducer.

Optionally, means for pressurizing the chamber may be provided, a rubber squeeze bulb, for example, and additionally a pressure gauge such as manometer may be included for setting the minimum pressure in the chamber at a level above ambient corresponding to the average minimum or diostolic blood pressure. Further, the drive may be of variable speed to simulate various heart beat rates.

The operation, features, and advantages of the invention will become more evident from the descritpion of the preferred embodiment taken in conjunction with the following drawings.

BRIEF DESCRIPTIONS OF THE DRAWINGS

DESCRIPTION OF THE PREFERRED EMBODIMENT

Figure 1:
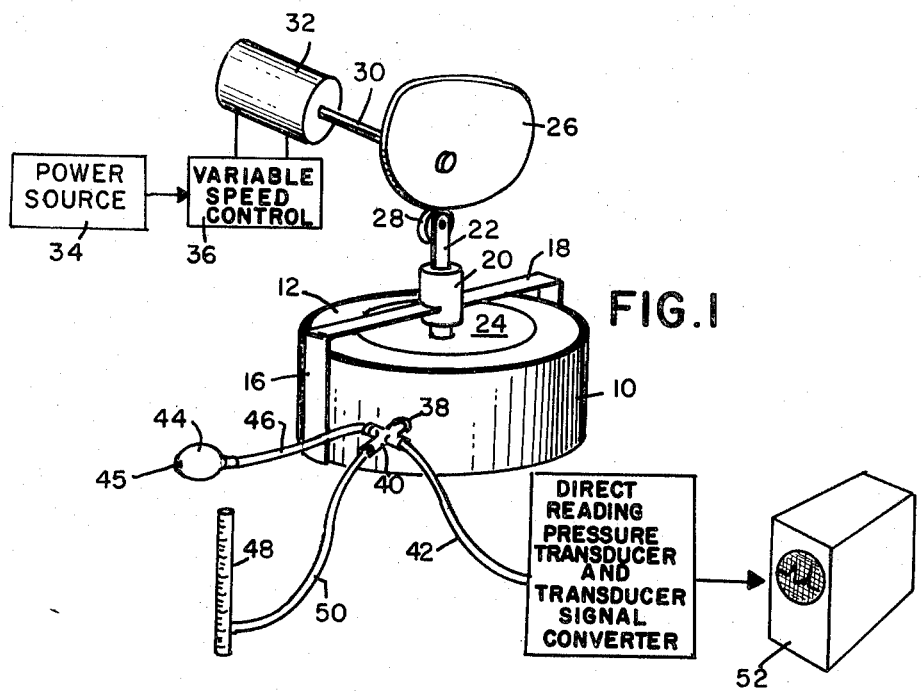
FIG. 1 is a perspective view of the preferred embodiment.

Referring to FIG. 1, there is illustrated a perspective view of the preferred embodiment of the invention. Pressure chamber 10 has diaphram 12 mounted in the top wall thereof secured by retaining ring 14. Arms 16 and 18, attached to the side of the chamber, provide rigid support for sleeve 20 through which passes thrust arm 22. A platten 24 is attached to the base of the rod which platten forces diapram 12 into the chamber upon rotation of cam 26 against bearing 28. The cam attached to shaft 30 is driven by motor 32, a d.c. motor for example, powered by power source 34, a battery dry cell or similar device. Variable speed control 36 a rheostat for example, may be included to adjust the cam rotation rate to a value within the range of the human heart beat. The nominal speed of the drive motor is about one revolution per second.

As discussed above, the cam is shaped proportionate to a hypothetical arterial blood pressure cycle. By hypothetical is meant an idealized or constructed blood pressure curve as an average individual might have. The basis for such a curve can be found in standard medical texts, Guyton, *Textbook of Medical Physiology*, W. B. Sander Co., Philadelphia, 1971, for example.

An outlet port 38 is located in a wall of the chamber into which multiport connector 40 is inserted. Tube 42 connects the direct reading blood pressure transducer to a junction of the connector. Optionally, the base level pressure of the chamber may be adjusted above ambient by squeezing bulb 44, connected to multiport connector 40 by tube 46, a sufficient number of times. Inlet 45 is located in the end wall of bulb 44 and is opened to draw air and then closed when the desired pressure is reached. The base level pressure is monitored by a gauge, manometer 48 attached to connector 40 by tube 50, for example.

In operation, the chamber is pressurized to the average diostatic blood pressure level, approximately 80 m.m Hg., by utilizing the bulb and manometer as described above. It is possible of course to check the function of the transducer from ambient to the highest level generated by the cam depressed diaphram without using a pressurizing device such as the bulb.

The variable drive is then set to a desired heart beat rate, approximately one beat per second and the power turned on. As the cam rotates a simulated arterial blood pressure cycle will be generated as an input to the direct pressure reading transducer and an analogous wave form will appear on read out osciliscope 52 or optionally an x-y graphic plotter. An improper wave form will alert the user to a malfunction in either the transducer or the transducer signal convertor or the osciliscope requiring trouble shooting and/or replacement procedures.

A proper wave form will indicate correct performance of the system for immediate hook-up to the patient.

Figure 2:
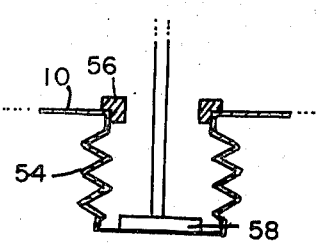
FIG. 2 is a cross-sectional view of an alternative construction of one component of the preferred embodiment.

Referring to FIG. 2, there is shown a cross-sectional view of an alternative to the diaphram comprising a bellows 54 held in place on chamber 10 by retaining ring 56. As in FIG. 1 above, the bellows is depressed by platten 58 attached to arm 60 and returned upward by the excess pressure developed within the chamber.

Figure 3:
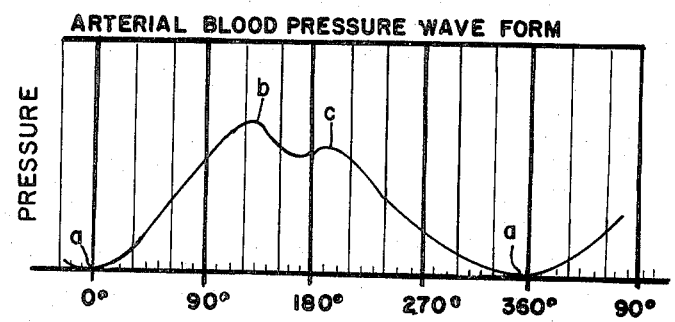
FIG. 3 is a cartesian graphic presentation of a hypothetical arterial blood pressure cycle.

FIG. 3 is a graphic representation in cartesian coordinates of the arterial blood pressure cycle wave form. Points a indicate the minimum or diastolic pressure and point b the maximum or systolic pressure. Point c indicates the apex of the dichrotic notch.

Figure 4:
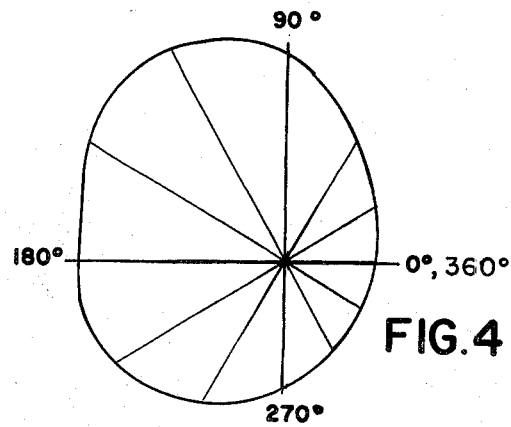
FIG. 4 is a polar graphic portrail of the wave form of FIG. 3.

FIG. 4 illustrates the conversion of the x-y wave form to polar coordinates yielding the shape of the cam.

What is claimed is:

1. A dynamic arterial blood pressure simulator comprising in combination:
   a. a pressure chamber having an outlet port;
   b. a flexible member within one wall of said chamber;
   c. cam means in communication with said flexible member for depressing said member into said chamber, said cam means having a shape proportionate to at least one hypothetical arterial blood pressure cycle; and
   d. drive means for rotating said cam for producing a variable pressure proportionate to said cycle at said outlet port.

2. The apparatus of claim 1 wherein said flexible member comprises a bellows.

3. The apparatus of claim 1 wherein said flexible member comprises a rubber diaphram.

4. The apparatus of claim 3 including pressurizing means for pressurizing said chamber to a base pressure and gauge means communicating with said chamber for measuring said base pressure.

5. The apparatus of claim 4 wherein said pressurizing means comprises a rubber bulb.

6. The apparatus of claim 5 wherein said gauge means comprises a manometer.

7. The apparatus of claim 6 including a cam follower assembly positioned between said cam and said diaphram, said assembly comprising in combination:
   a. a thrust arm;
   b. a platten attached to one end of said rod in contact with said diaphram; and
   c. a rotatable bearing at the opposite end of said rod in contact with said cam.

8. The apparatus of claim 7 wherein said drive means comprises a variable speed electric motor.

* * * * *